(12) United States Patent
Oehlert et al.

(10) Patent No.: US 8,049,644 B1
(45) Date of Patent: Nov. 1, 2011

(54) METHOD FOR TAWS DEPICTION ON SVS PERSPECTIVE DISPLAYS

(75) Inventors: Steve L. Oehlert, Cedar Rapids, IA (US); Jason C. Wenger, North Liberty, IA (US); Alex Postnikov, Cedar Rapids, IA (US); Andrew M. Pelzer, Atalissa, IA (US); Sarah Barber, Robins, IA (US)

(73) Assignee: Rcokwell Collins, Inc., Cedar Rapids, IA (US)

( * ) Notice: Subject to any disclaimer, the term of this patent is extended or adjusted under 35 U.S.C. 154(b) by 154 days.

(21) Appl. No.: 11/787,460

(22) Filed: Apr. 17, 2007

(51) Int. Cl.
G08B 23/00 (2006.01)

(52) U.S. Cl. ........ 340/970; 340/963; 340/967; 340/980; 340/971; 701/301; 701/14; 701/9; 345/633; 345/618

(58) Field of Classification Search .......... 340/945–961, 340/963, 967, 980, 971; 345/633, 618; 701/3, 701/301, 14, 9; 382/294, 284
See application file for complete search history.

(56) References Cited

U.S. PATENT DOCUMENTS

| | | | |
|---|---|---|---|
| 2,930,035 A | 3/1960 | Altekruse | |
| 2,294,966 A | 8/1961 | Senitsky et al. | |
| 3,153,234 A | 10/1964 | Begeman et al. | |
| 3,312,088 A | 10/1965 | Alexander et al. | |
| 3,241,141 A | 3/1966 | Wall | |
| 3,325,807 A | 6/1967 | Burns et al. | |
| 3,373,423 A | 3/1968 | Levy | |
| 3,397,397 A | 8/1968 | Barney | |
| 3,739,380 A | 6/1973 | Burdle et al. | |
| 3,815,132 A | 6/1974 | Case, Jr. et al. | |
| 3,866,222 A | 2/1975 | Young | |
| 4,654,665 A | 3/1987 | Kiuchi et al. | |
| 4,760,396 A | 7/1988 | Barney et al. | |
| 4,888,599 A | 12/1989 | Harwood et al. | |
| 5,945,926 A | 8/1999 | Ammar et al. | |
| 6,002,347 A * | 12/1999 | Daly et al. | 340/963 |
| 6,008,756 A | 12/1999 | Boerhave et al. | |
| 6,016,121 A | 1/2000 | Bogensberger et al. | |
| 6,023,240 A | 2/2000 | Sutton | |
| 6,044,324 A | 3/2000 | Boerhave et al. | |
| 6,064,922 A | 5/2000 | Lee | |
| 6,064,942 A | 5/2000 | Johnson et al. | |
| 6,085,129 A | 7/2000 | Schardt et al. | |
| 6,085,150 A | 7/2000 | Henry et al. | |
| 6,107,943 A | 8/2000 | Schroeder | |
| 6,111,701 A | 8/2000 | Brown | |
| 6,121,899 A | 9/2000 | Theriault | |
| 6,127,944 A * | 10/2000 | Daly et al. | 340/963 |
| 6,128,553 A | 10/2000 | Gordon et al. | |
| 6,140,772 A | 10/2000 | Bishop | |
| 6,154,151 A | 11/2000 | McElreath et al. | |
| 6,166,661 A | 12/2000 | Anderson et al. | |
| 6,175,314 B1 | 1/2001 | Cobley | |

(Continued)

OTHER PUBLICATIONS

Adams, Charlotte, "Synthetic Vision: Picturing the Future," *Avionics magazine, Solutions for Global Airspace Electronics*, Oct. 2006, cover and pp. 22-29.

(Continued)

*Primary Examiner* — Hoi Lau
(74) *Attorney, Agent, or Firm* — Daniel M. Barbieri

(57) ABSTRACT

A terrain advisory display including a display, a processing circuit coupled to the display and wherein the display is configured to generate a three-dimensional image.

20 Claims, 11 Drawing Sheets

U.S. PATENT DOCUMENTS

| | | |
|---|---|---|
| 6,191,839 B1 | 2/2001 | Briley et al. |
| 6,201,494 B1 | 3/2001 | Kronfeld |
| 6,205,376 B1 | 3/2001 | Gordon |
| 6,216,267 B1 | 4/2001 | Mitchell |
| 6,233,522 B1 | 5/2001 | Morici |
| 6,236,511 B1 | 5/2001 | Brown |
| 6,239,745 B1 | 5/2001 | Stratton |
| 6,266,114 B1 | 7/2001 | Skarohlid |
| 6,266,582 B1 | 7/2001 | Bruckner |
| 6,272,572 B1 | 8/2001 | Backhaus et al. |
| 6,278,799 B1 | 8/2001 | Hoffman |
| 6,281,832 B1 | 8/2001 | McElreath |
| 6,285,298 B1 | 9/2001 | Gordon |
| 6,285,313 B1 | 9/2001 | Wahab et al. |
| 6,285,926 B1 | 9/2001 | Weiler et al. |
| 6,297,810 B1 | 10/2001 | Anderson |
| 6,298,286 B1 | 10/2001 | Ying |
| 6,308,116 B1 | 10/2001 | Ricks et al. |
| 6,313,759 B1 | 11/2001 | Musland-Sipper |
| 6,317,690 B1 * | 11/2001 | Gia ............................. 701/301 |
| 6,317,872 B1 | 11/2001 | Gee et al. |
| 6,320,634 B1 | 11/2001 | Winker et al. |
| 6,335,694 B1 | 1/2002 | Beksa et al. |
| 6,336,728 B1 | 1/2002 | Deloy |
| 6,343,863 B1 | 2/2002 | Wood |
| 6,345,127 B1 | 2/2002 | Mitchell |
| 6,353,425 B1 | 3/2002 | Mosier |
| 6,359,669 B1 | 3/2002 | Dehmlow |
| 6,362,797 B1 | 3/2002 | Dehmlow |
| 6,366,350 B1 | 4/2002 | Thornburg et al. |
| 6,366,836 B1 | 4/2002 | Johnson |
| 6,373,216 B1 | 4/2002 | Ho |
| 6,373,478 B1 | 4/2002 | Steffensmeier |
| 6,373,536 B1 | 4/2002 | Mell et al. |
| 6,374,286 B1 | 4/2002 | Gee et al. |
| 6,388,607 B1 | 5/2002 | Woodell |
| 6,388,608 B1 | 5/2002 | Woodell et al. |
| 6,388,611 B1 | 5/2002 | Dillman |
| 6,388,724 B1 | 5/2002 | Campbell et al. |
| 6,388,821 B1 | 5/2002 | Dehmlow |
| 6,390,920 B1 | 5/2002 | Infiesto et al. |
| 6,392,358 B1 | 5/2002 | Runau et al. |
| 6,401,013 B1 | 6/2002 | McElreath |
| 6,401,038 B2 * | 6/2002 | Gia ............................. 701/301 |
| 6,419,372 B1 | 7/2002 | Shaw et al. |
| 6,424,288 B1 | 7/2002 | Woodell |
| 6,426,717 B1 | 7/2002 | Maloratsky |
| 6,441,773 B1 | 8/2002 | Kelly et al. |
| 6,445,573 B1 | 9/2002 | Portman et al. |
| 6,448,787 B1 | 9/2002 | Oglesby |
| 6,448,922 B1 | 9/2002 | Kelly |
| 6,449,556 B1 | 9/2002 | Pauly |
| 6,452,155 B1 | 9/2002 | Sherlock et al. |
| 6,452,330 B1 | 9/2002 | Steffensmeier |
| 6,452,511 B1 | 9/2002 | Kelly et al. |
| 6,453,259 B1 | 9/2002 | Infiesto |
| 6,453,267 B1 | 9/2002 | Rudzik et al. |
| 6,457,837 B1 | 10/2002 | Steffensmeier |
| 6,466,235 B1 | 10/2002 | Smith et al. |
| 6,473,240 B1 | 10/2002 | Dehmlow |
| 6,477,163 B1 | 11/2002 | Miller |
| 6,487,526 B1 | 11/2002 | Mitchell |
| 6,492,934 B1 | 12/2002 | Hwang et al. |
| 6,494,587 B1 | 12/2002 | Shaw et al. |
| 6,497,486 B1 | 12/2002 | Robertson |
| 6,499,027 B1 | 12/2002 | Weinberger |
| 6,512,476 B1 | 1/2003 | Woodell |
| 6,512,527 B1 | 1/2003 | Barber et al. |
| 6,513,937 B1 | 2/2003 | Dehmlow |
| 6,515,624 B1 | 2/2003 | Roesler et al. |
| 6,521,879 B1 | 2/2003 | Rand et al. |
| 6,525,674 B1 | 2/2003 | Kelly et al. |
| 6,529,706 B1 | 3/2003 | Mitchell |
| 6,531,669 B1 | 3/2003 | Miller et al. |
| 6,535,266 B1 | 3/2003 | Nemeth et al. |
| 6,540,363 B1 | 4/2003 | Steffensmeier |
| 6,549,161 B1 | 4/2003 | Woodell |
| 6,552,735 B1 | 4/2003 | Dehmlow |
| 6,552,789 B1 | 4/2003 | Modro |
| 6,561,600 B1 | 5/2003 | Seeley et al. |
| 6,567,014 B1 | 5/2003 | Hansen et al. |
| 6,567,395 B1 | 5/2003 | Miller |
| 6,567,728 B1 | 5/2003 | Kelly et al. |
| 6,571,166 B1 | 5/2003 | Johnson et al. |
| 6,571,171 B1 | 5/2003 | Pauly |
| RE38,142 E | 6/2003 | Berry et al. |
| 6,573,914 B1 | 6/2003 | Pauly et al. |
| 6,574,020 B1 | 6/2003 | Ovens |
| 6,574,030 B1 | 6/2003 | Mosier |
| 6,577,947 B1 | 6/2003 | Kronfeld et al. |
| 6,590,560 B1 | 7/2003 | Lucas |
| 6,598,227 B1 | 7/2003 | Berry et al. |
| 6,603,425 B1 | 8/2003 | Woodell |
| 6,604,683 B1 | 8/2003 | Jones |
| 6,608,614 B1 | 8/2003 | Johnson |
| 6,614,126 B1 | 9/2003 | Mitchell |
| 6,633,286 B1 | 10/2003 | Do et al. |
| 6,639,349 B1 | 10/2003 | Bahadur |
| 6,639,522 B2 | 10/2003 | Derderian |
| 6,650,275 B1 | 11/2003 | Kelly et al. |
| 6,666,896 B1 | 12/2003 | Peng |
| 6,686,851 B1 | 2/2004 | Gordon et al. |
| 6,687,316 B1 | 2/2004 | McGraw |
| 6,690,298 B1 | 2/2004 | Barber et al. |
| 6,690,299 B1 | 2/2004 | Suiter |
| 6,693,653 B1 | 2/2004 | Pauly |
| 6,694,249 B1 | 2/2004 | Anderson et al. |
| 6,700,555 B1 | 3/2004 | Jones |
| 6,714,186 B1 | 3/2004 | Mosier et al. |
| 6,727,468 B1 | 4/2004 | Nemeth |
| 6,741,203 B1 | 5/2004 | Woodell |
| 6,741,841 B1 | 5/2004 | Mitchell |
| 6,744,382 B1 | 6/2004 | Lapis et al. |
| 6,782,392 B1 | 8/2004 | Weinberger et al. |
| 6,789,921 B1 | 9/2004 | Deloy et al. |
| 6,799,095 B1 | 9/2004 | Owen et al. |
| 6,801,362 B1 | 10/2004 | Brown |
| 6,807,148 B1 | 10/2004 | Eicher |
| 6,807,538 B1 | 10/2004 | Weinberger et al. |
| 6,812,992 B2 | 11/2004 | Nemeth |
| 6,813,777 B1 | 11/2004 | Weinberger et al. |
| 6,819,365 B1 | 11/2004 | Peng |
| 6,832,152 B1 | 12/2004 | Bull et al. |
| 6,839,017 B1 | 1/2005 | Dillman |
| 6,842,204 B1 | 1/2005 | Johnson |
| 6,843,591 B1 | 1/2005 | Peng et al. |
| 6,850,185 B1 | 2/2005 | Woodell |
| 6,871,124 B1 | 3/2005 | McElreath |
| 6,876,906 B1 | 4/2005 | Zellers et al. |
| 6,879,280 B1 | 4/2005 | Bull et al. |
| 6,879,886 B2 * | 4/2005 | Wilkins et al. ................. 701/3 |
| 6,880,147 B1 | 4/2005 | Pauly |
| 6,882,302 B1 | 4/2005 | Woodell et al. |
| 6,918,134 B1 | 7/2005 | Sherlock et al. |
| 6,933,534 B1 | 8/2005 | Steffensmeier |
| 6,937,194 B1 | 8/2005 | Meier et al. |
| 6,937,377 B1 | 8/2005 | Brown et al. |
| 6,938,258 B1 | 8/2005 | Weinberger et al. |
| 6,944,032 B1 | 9/2005 | Steffensmeier et al. |
| 6,961,445 B1 | 11/2005 | Jensen et al. |
| 6,970,151 B1 | 11/2005 | Mosier |
| 6,972,788 B1 | 12/2005 | Robertson et al. |
| 6,977,608 B1 | 12/2005 | Anderson et al. |
| 6,980,182 B1 | 12/2005 | Nimmer et al. |
| 6,987,787 B1 | 1/2006 | Mick |
| 6,995,823 B1 | 2/2006 | Kelly et al. |
| 6,997,301 B1 | 2/2006 | Seeley et al. |
| 6,999,022 B1 | 2/2006 | Vesel et al. |
| 7,002,546 B1 | 2/2006 | Stuppi et al. |
| 7,002,947 B1 | 2/2006 | McFarland et al. |
| 7,002,994 B1 | 2/2006 | Haendel |
| 7,009,601 B1 | 3/2006 | Sherlock et al. |
| 7,010,398 B2 * | 3/2006 | Wilkins et al. ................. 701/3 |
| 7,023,375 B2 | 4/2006 | Klausing |
| 7,026,956 B1 | 4/2006 | Wenger et al. |
| 7,028,304 B1 | 4/2006 | Weinberger et al. |
| 7,036,946 B1 | 5/2006 | Mosier |

| | | | |
|---|---|---|---|
| 7,053,796 B1 | 5/2006 | Barber | |
| 7,057,549 B2 | 6/2006 | Block | |
| 7,064,680 B2 | 6/2006 | Reynolds et al. | |
| 7,069,120 B1 | 6/2006 | Koenck et al. | |
| 7,089,092 B1 | 8/2006 | Wood et al. | |
| 7,091,927 B1 | 8/2006 | Hagge et al. | |
| 7,095,562 B1 | 8/2006 | Peng et al. | |
| 7,098,913 B1 | 8/2006 | Etherington et al. | |
| RE39,303 E | 9/2006 | Sklar et al. | |
| 7,109,912 B1 | 9/2006 | Paramore et al. | |
| 7,109,913 B1 | 9/2006 | Paramore et al. | |
| 7,119,956 B1 | 10/2006 | Sliney, Jr. | |
| 7,123,260 B2 * | 10/2006 | Brust | 345/428 |
| 7,129,885 B1 | 10/2006 | Woodell et al. | |
| 7,138,619 B1 | 11/2006 | Ferrante et al. | |
| 7,148,816 B1 | 12/2006 | Carrico | |
| 7,148,935 B1 | 12/2006 | Ho et al. | |
| 7,158,072 B1 | 1/2007 | Venkatachalam et al. | |
| 7,161,525 B1 | 1/2007 | Finley et al. | |
| 7,167,308 B1 | 1/2007 | Krishnamurthy et al. | |
| 7,180,476 B1 | 2/2007 | Guell et al. | |
| 7,191,406 B1 | 3/2007 | Barber et al. | |
| 7,196,329 B1 | 3/2007 | Wood et al. | |
| 7,212,175 B1 | 5/2007 | Magee et al. | |
| 7,212,216 B2 * | 5/2007 | He et al. | 345/629 |
| 7,212,532 B1 | 5/2007 | McFarland et al. | |
| 7,212,920 B1 | 5/2007 | Bailey et al. | |
| 7,213,055 B1 | 5/2007 | Kathol | |
| 7,216,296 B1 | 5/2007 | Broberg et al. | |
| 7,218,123 B1 | 5/2007 | Tsamis et al. | |
| 7,219,011 B1 | 5/2007 | Barber | |
| 7,230,613 B1 | 6/2007 | Steffensmeier et al. | |
| 7,230,999 B1 | 6/2007 | Deines et al. | |
| 7,242,343 B1 | 7/2007 | Woodell | |
| 7,262,713 B1 | 8/2007 | Vogl et al. | |
| 7,292,178 B1 | 11/2007 | Woodell et al. | |
| 7,337,043 B2 * | 2/2008 | Bull | 701/1 |
| 7,352,292 B2 * | 4/2008 | Alter et al. | 340/945 |
| 7,375,678 B2 | 5/2008 | Feyereisen et al. | |
| 7,379,796 B2 | 5/2008 | Walsdorf et al. | |
| 2001/0023390 A1 * | 9/2001 | Gia | 701/301 |
| 2002/0039070 A1 * | 4/2002 | Ververs et al. | 340/901 |
| 2002/0158256 A1 | 10/2002 | Yamada et al. | |
| 2003/0021491 A1 * | 1/2003 | Brust | 382/294 |
| 2003/0195672 A1 * | 10/2003 | He | 701/3 |
| 2003/0222887 A1 * | 12/2003 | Wilkins et al. | 345/618 |
| 2004/0083038 A1 * | 4/2004 | He | 701/3 |
| 2004/0160341 A1 * | 8/2004 | Feyereisen et al. | 340/970 |
| 2005/0052451 A1 * | 3/2005 | Servantie | 345/419 |
| 2005/0200502 A1 * | 9/2005 | Reusser et al. | 340/973 |
| 2006/0004497 A1 * | 1/2006 | Bull | 701/10 |
| 2006/0097895 A1 * | 5/2006 | Reynolds et al. | 340/961 |
| 2006/0290531 A1 * | 12/2006 | Reynolds et al. | 340/961 |
| 2007/0002078 A1 * | 1/2007 | He et al. | 345/633 |
| 2007/0018887 A1 * | 1/2007 | Feyereisen et al. | 342/176 |
| 2007/0146364 A1 * | 6/2007 | Aspen | 345/426 |
| 2007/0171094 A1 * | 7/2007 | Alter et al. | 340/970 |
| 2007/0176794 A1 * | 8/2007 | Feyereisen et al. | 340/970 |
| 2007/0247350 A1 * | 10/2007 | Ryan | 342/65 |
| 2008/0051947 A1 * | 2/2008 | Kemp | 701/3 |
| 2009/0040070 A1 * | 2/2009 | Alter et al. | 340/945 |

OTHER PUBLICATIONS

Adams, Charlotte, "Synthetic Vision: Picturing the Future," *Avionics magazine*, Oct. 1, 2006, printed from website www.aviationtoday.com, 4 pages.

Blue Mountain Avionics' Products, printed from website www.bluemountainavionics.com on Aug. 28, 2007, 4 pages.

"MountainScope™ on a TabletPC," PCAvionics™, printed from website www.pcavionics.com on Aug. 28, 2007, 1 page.

"PCAvionics: Makers of MountainScope™, A New Dimension in Situational Awareness," PCAvionics™, printed from website www.pcavionics.com on Aug. 28, 2007, 1 page.

Pictures of DELPHINS, printed from website www.tunnel-in-the-sky.tudelft.nl on Aug. 28, 2007, 4 pages.

"TAWS Terrain Awareness and Warning System," Universal® Avionics, printed from website www.uasc.com on Aug. 28, 2007, 2 pages.

TAWA Class A and Class B, Terrain Awareness and Warning Systems, Universal® Avionics Systems Corporation, Sep. 2007, 6 pages.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Van Kasteren, Joost, :Tunnel-in-the-Sky, Synthetic vision simplifies the pilot's job and enhances safety, printed from website www.delftoutlook.tudelft.nl on Aug. 28, 2007, 13 pages.

* cited by examiner

METHOD FOR TAWS DEPICTION ON SVS PERSPECTIVE DISPLAYS

BACKGROUND

The present disclosure relates generally to the field of synthetic vision information systems. Specifically, the present disclosure relates to a system and method of depicting TAWS alert information in the synthetic vision display.

The synthetic vision information system may be utilized in combination with a Terrain Awareness and Warning System ("TAWS") to communicate with aircrew that the aircraft's flight path may be on an imminent collision course with an obstacle. TAWS may include a Ground Proximity Warning System (GPWS), a Ground Collision Avoidance Systems (GCAS), a Terrain Awareness and Warning System or any combination thereof.

A synthetic vision information system may be used to improve situational awareness which may reduce pilot workload to allow the aircrews to avoid mistakes, such as flying too close to terrain, landing short or entering an active runway. A synthetic vision information system may further aid aircrews in re-planning en route and during final approach segments by providing intuitive guidance cues to reduce pilot workload and improve performance.

Synthetic vision information systems use terrain and obstacle databases to produce terrain maps that show a perspective version of the outside world on a two-dimensional display screen. These scenes may be generated based on positioning data, aircraft altitude and other data. Also included on the display are obstacle and terrain warnings based on the projected flight path. Synthetic vision information systems create a perspective display of the geographic area around the plane by utilizing a digital three-dimensional map of a geographic area and the aircraft's positioning data to precisely locate the plane's location and altitude.

When the plane's location and altitude trigger a warning that the aircraft's flight path may be on an imminent collision course with an obstacle, the synthetic vision information system, in combination with TAWS, communicates this warning to the aircrew. However, this warning message does not provide sufficient obstacle characteristic details (i.e. size, shape or adjacent obstacles).

What is needed is a synthetic vision system configured to provide sufficient obstacle characteristic details to allow the aircrew to more effectively determine the appropriate course of action in a warning situation.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to a display system including a display and a processing circuit coupled to the display. The display system further including a graphic processing engine coupled to the display and processing circuit. The display system also includes a terrain database coupled to the processing circuit and a terrain awareness and warning system coupled to the processing circuit and the sensor system. The sensor system is coupled to the processing circuit. The display system further includes a warning signal database coupled to the processing circuit and the warning signal database is configured to transmit a first warning signal to the processing circuit. The terrain awareness and warning system is also configured to transmit a caution signal and/or a second warning signal to the processing circuit. The processing circuit is configured to retrieve terrain data from the terrain database and determine a display configuration signal, which is sent to the graphic processing engine, based on the terrain data, the first warning signal and the caution signal and/or the second warning signal.

Another embodiment of the disclosure relates to a terrain advisory display including a display, a processing circuit coupled to the display, a warning signal database, a terrain database and a terrain awareness and warning system. The terrain awareness and warning system, the terrain database and the warning signal database are coupled to the sensor system and wherein the display is configured to generate a three-dimensional image.

Yet another embodiment of the disclosure relates to a method for generating a three-dimensional image for an aircraft terrain advisory system including receiving terrain data from a terrain database, receiving a caution signal and/or a warning signal from the terrain awareness and warning system, defining the three-dimensional image, generating the three-dimensional image and displaying the three-dimensional image on the aircraft terrain advisory system.

Yet another embodiment of the disclosure relates to a terrain advisory system for an aircraft including a means for displaying data on the aircraft and a means for generating a terrain data. The terrain advisory system also includes a means for generating a plurality of aircraft sensor data, a means for generating a terrain signal and a means for generating a first warning signal. The terrain advisory system further includes a means for generating a caution and/or a second warning signal, a means for generating a three-dimensional image and a means for displaying the three-dimensional image.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
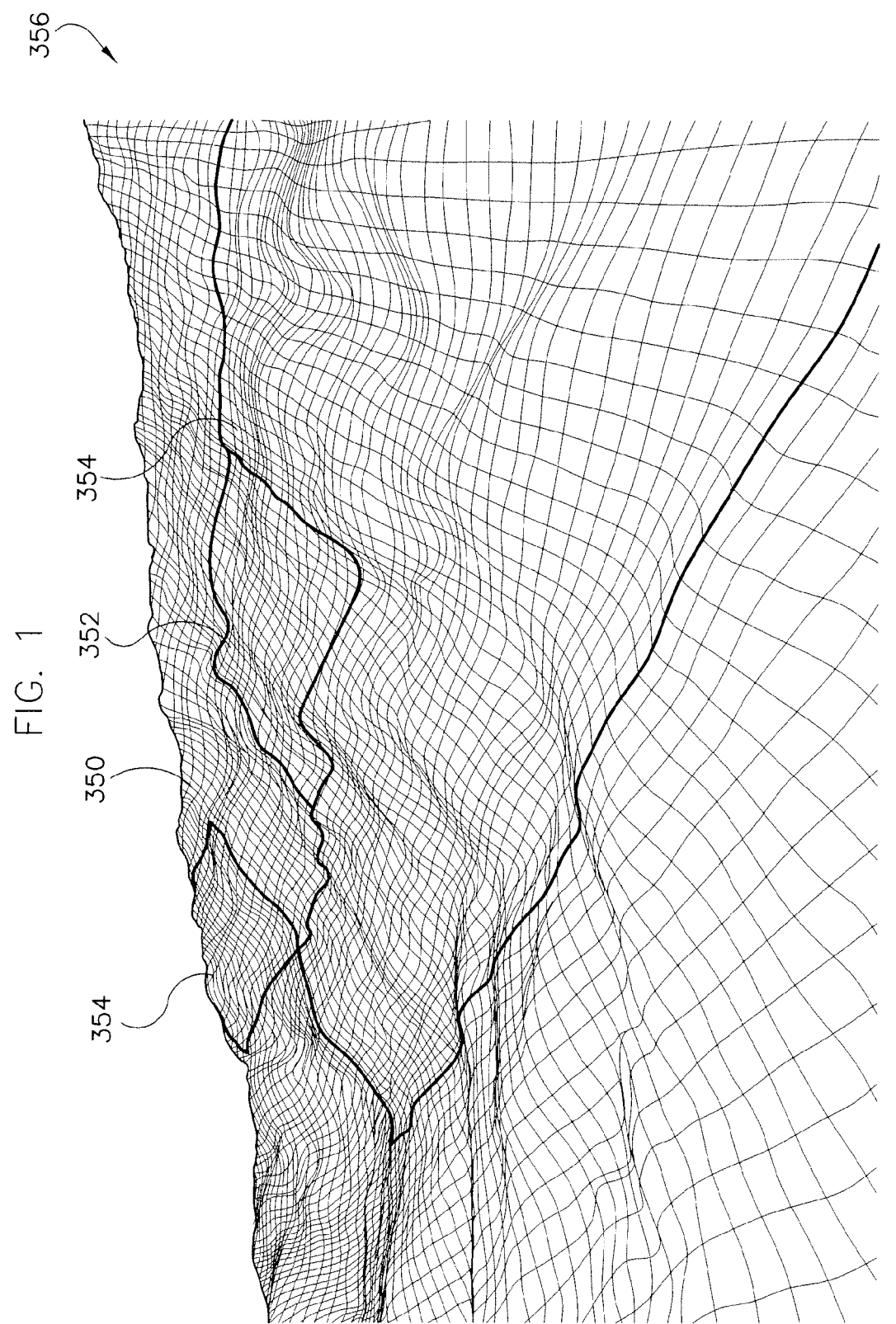
FIG. 1 is an illustration of a three-dimensional perspective synthetic vision information terrain display, according to one exemplary embodiment.

FIG. 1 shows an illustration of three-dimensional perspective image 356 in a synthetic vision information terrain display. Three-dimensional perspective image 356 illustrating a reference image and a generated integrated terrain map are shown. Three-dimensional perspective image 356 shows a reference image that shows a terrain map having full resolution. Three-dimensional perspective image 356 includes high terrain 352, medium terrain 354 and low terrain 350.

Figure 2:
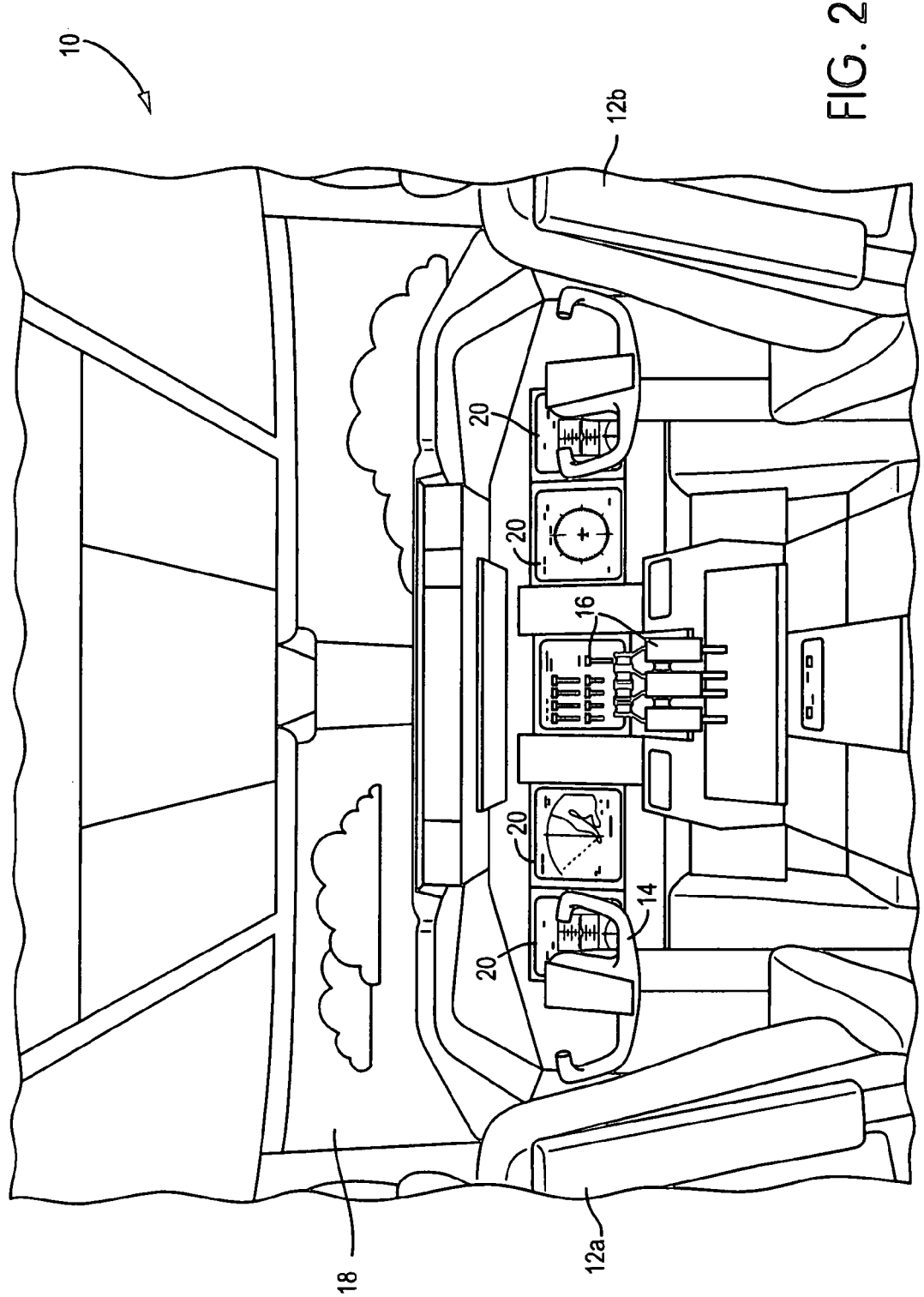
FIG. 2 is an illustration of an aircraft control center, according to one exemplary embodiment.

Referring to FIG. 2, an illustration of an aircraft control center 10 is shown, according to one exemplary embodiment. Aircraft control center 10 may include a pilot seat 12a, a co-pilot seat 12b, an aircraft control stick 14, a plurality of flight controls 16 and flight displays 20. The pilot sitting in pilot seat 12a may utilize aircraft control stick 14 to maneuver airplane 100 (see FIGS. 5, 7A-7D). The pilot may initiate airplane 100 maneuvers including moving airplane 100 in an upwardly motion, downwardly motion, banking to the left, banking to the right or any combination thereof. The pilot can visually monitor the flight path thorough windshield 18. However, when the pilot utilizes windshield 18, his visual range is limited.

The crew utilizes flight displays 20 to increase their visual range and to enhance their decision-making abilities. In an exemplary embodiment, flight displays 20 may be configured to show weather, terrain, fixed obstacles, variable obstacles (i.e., other airplanes), flight characteristics (i.e., altitude or speed), or any combination thereof.

Figure 3:
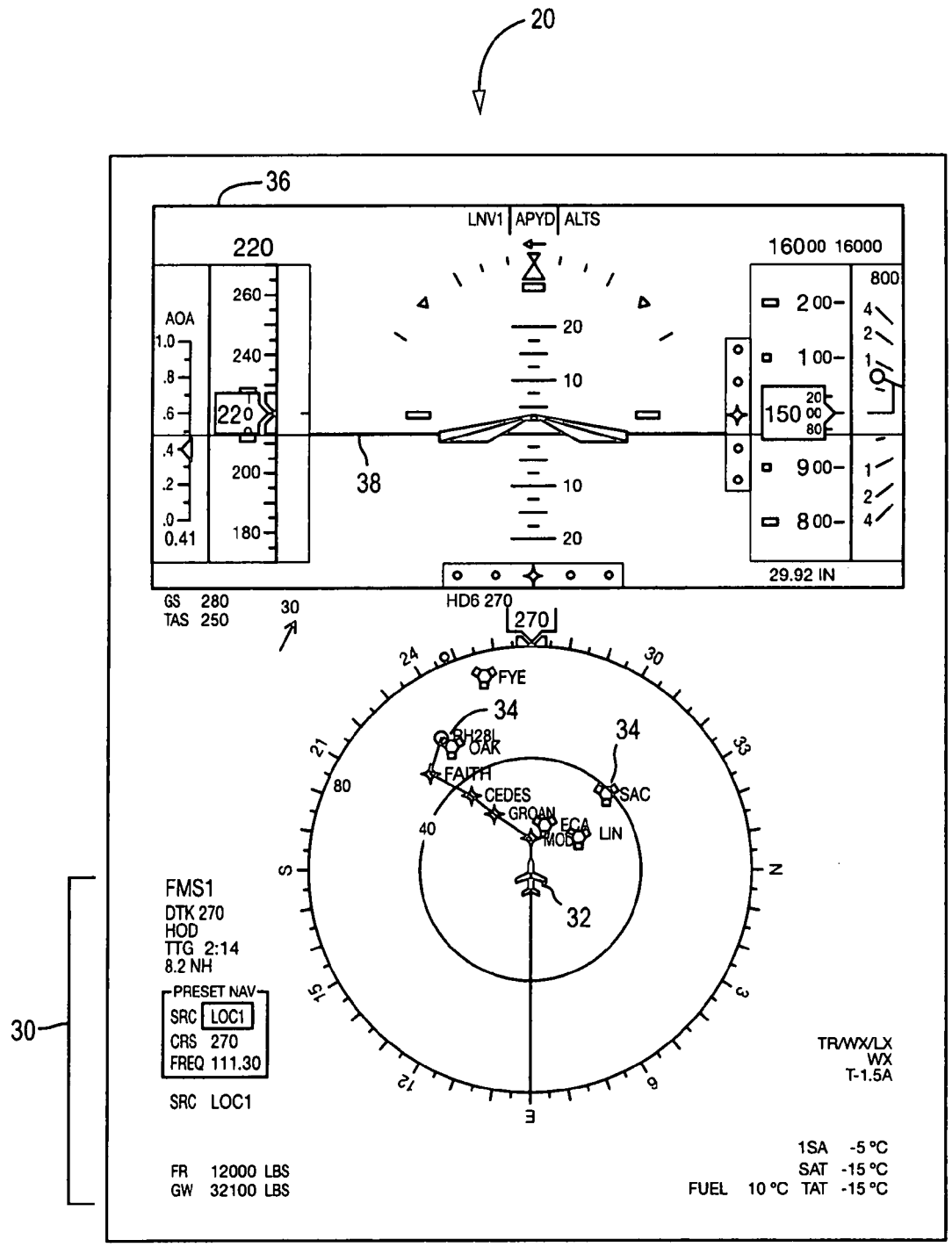
FIG. 3 is an illustration of a display screen.

In FIG. 3, flight display 20 is shown. Flight display 20 indicates flight characteristics 30, an airplane position 32 and navaids 34. Flight display 20 includes a forward view 36 which illustrates a horizon line indicator 38.

Figure 4:
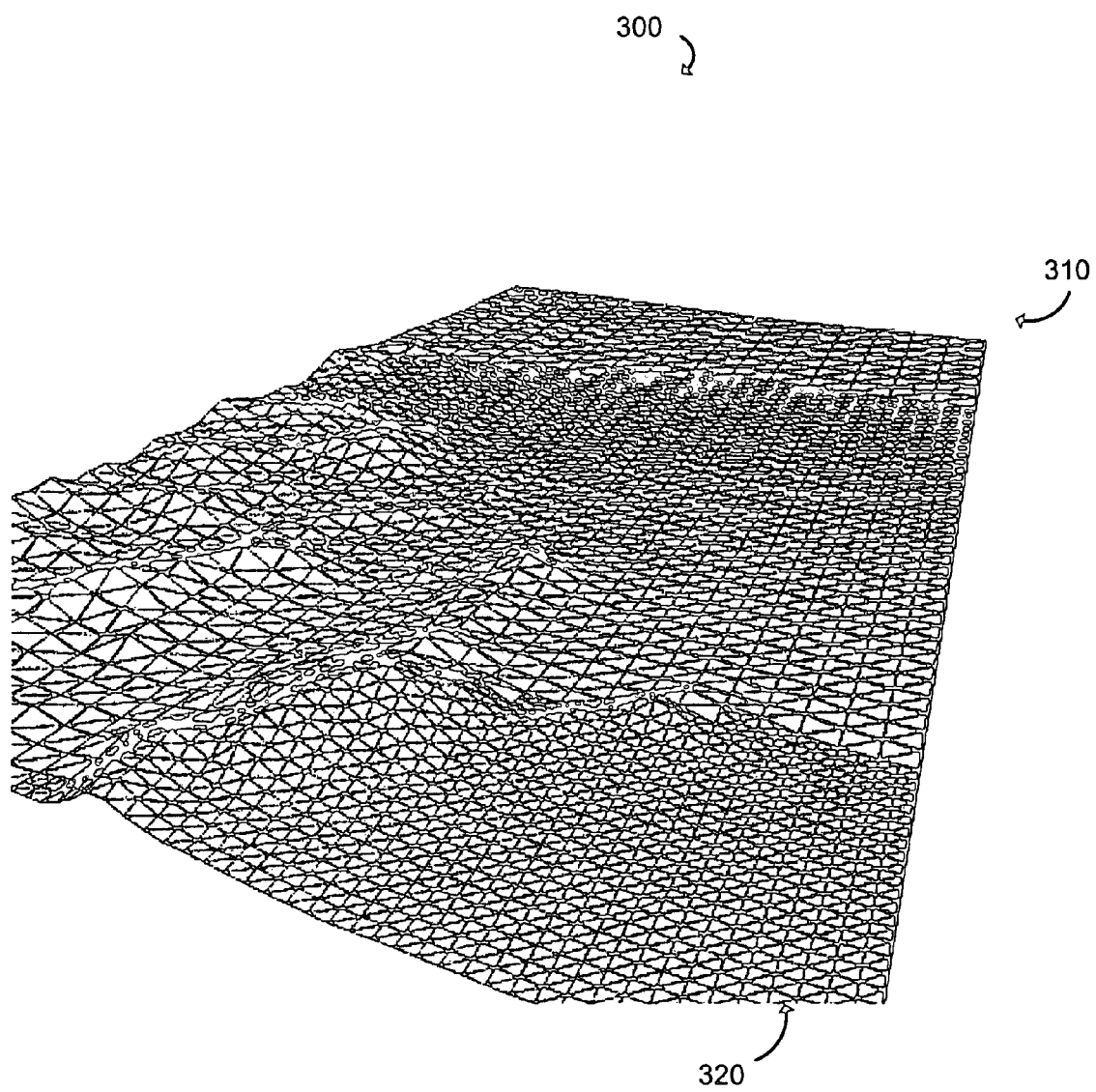
FIG. 4 is an illustration of a perspective synthetic vision information display.

FIG. 4 shows an illustration of a perspective synthetic vision information terrain display. A visual display image 300 illustrating a reference image and an integrated terrain map 310 are shown. Visual display image 300 shows a reference image that shows a terrain map having full resolution. Visual display image 300 comprises integrated terrain map 310, which includes a plurality of areas 320 which have higher resolutions.

Figure 5:
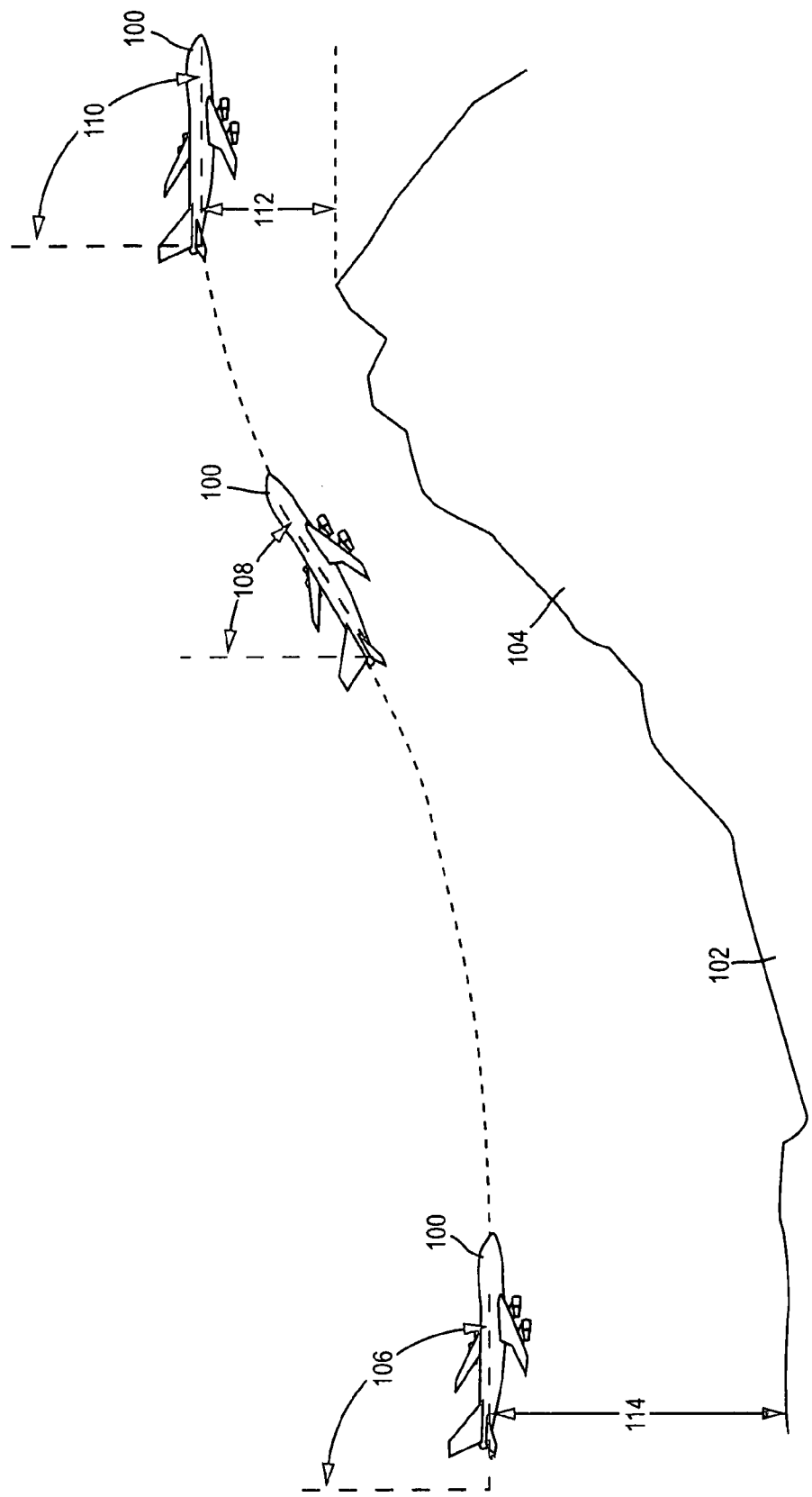
FIG. 5 is an illustration of an aircraft maneuvering over an obstacle by increasing the altitude of the aircraft.

Now referring to FIG. 5, airplane 100 is traveling on a flight path and utilizing a conventional display. Airplane 100 is at a first position 106 which has an altitude that is a first distance 114 above a terrain 102. Airplane 100 continues on the flight path until a warning signal is triggered, because airplane 100 would impact a mountain 104 by continuing on this flight path at first distance 114 above terrain 102. Airplane 100 moves to a second position 108 which has an altitude that requires airplane 100 to continue to ascend in order to traverse mountain 104. Airplane 100 moves to a third position 110 which has an altitude 112 above mountain 104 that will allow airplane 100 to stop ascending and not make contact with mountain 104. In this example, the crew receives a warning signal with limited information. The crew only knows that an obstacle is in the flight path. The crew may not be informed of the size and/or shape of the obstacle. The flight crew may respond to this warning signal by pulling back on airplane control stick 14 to initiate a maneuver that tests the performance characteristics of airplane 100.

Figure 6:
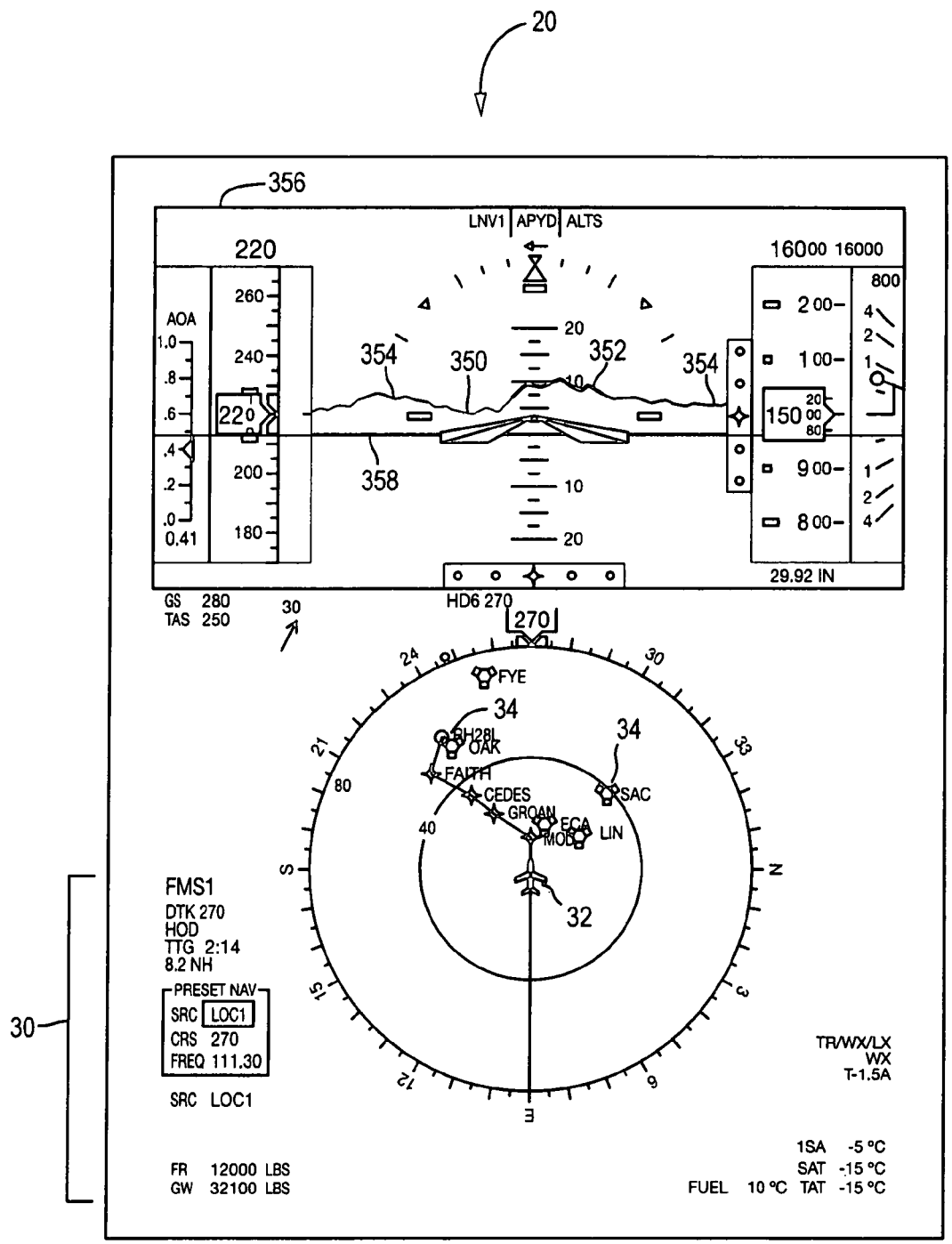
FIG. 6 is an illustration of a synthetic vision information terrain display screen, according to one exemplary embodiment.

In FIG. 6, flight display 20 including a three-dimensional perspective image 356 is shown, according to an exemplary embodiment. Flight display 20 indicates flight characteristics 30, airplane position 32 and navaids 34. Flight display 20 includes a terrain view 358 which illustrates a high terrain 352, a medium terrain 354 and a low terrain 350. In an exemplary embodiment, the color of high terrain 352, medium terrain 354 and low terrain 350 may be configured to be different colors to allow the aircrew to quickly recognize a potential hazard. In another exemplary embodiment, high terrain 352 may be configured to flash, enlarge, turn red or any combination thereof to provide a warning signal to the aircrew.

Now referring to FIG. 1, which illustrates three-dimensional perspective image 356 in a synthetic vision information terrain display. In an exemplary embodiment, the system consists of two major parts, which are the TAWS function and the high resolution perspective terrain display (HRTD). The TAWS function generates input into the HRTD in the form of the conflict and warning cells. In an exemplary embodiment, the cell is an area that is defined by a latitude and longitude reference point. The cell has a length and a width. A TAWS cell has low resolution and covers a relatively large area. In an exemplary embodiment, the area is 30 arc seconds on each side.

In an exemplary embodiment, the HRTD depicts terrain using high resolution terrain data. In this exemplary embodiment, the HRTD cell has high resolution and the area is 3 arc seconds on each side. In this exemplary embodiment, the spacing between terrain data samples is smaller than the dimension of the TAWS cell. The TAWS cell covers multiple terrain data samples. In this exemplary embodiment, the TAWS cell will cover 10×10=100 terrain samples based on the 30 to 3 ratio.

In an exemplary embodiment, the depiction of the TAWS warnings and caution cells are visualized as larger blocks on top of the finer mesh of terrain. In an exemplary embodiment, a yellow color may be displayed for a caution cell and a red may be displayed for a warning cell.

Figure 7A:
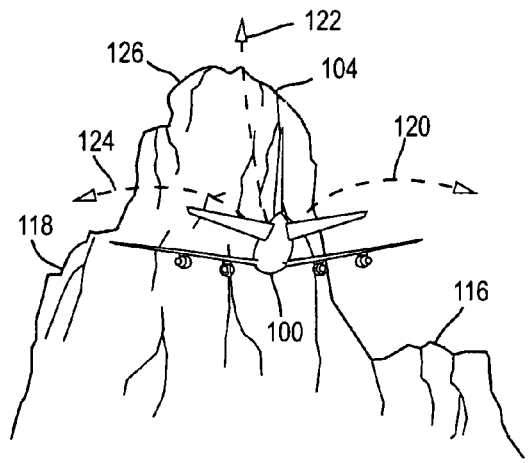
FIGS. 7A-7D are illustrations of potential aircraft maneuvering options to avoid an obstacle, according to an exemplary embodiment.

FIGS. 7A-7D are illustrations of potential aircraft maneuvering options to avoid an obstacle, according to exemplary embodiments. FIG. 7A shows airplane 100 approaching mountain 104. Airplane 100 has at least three options to maneuver around mountain 104. Airplane's 100 maneuvering options include a right travel path 120, a left travel path 124 or a pull-up travel path 122. Mountain 104 includes a peak portion 126, a plateau portion 116 and a steep side portion 118.

Figure 7B:
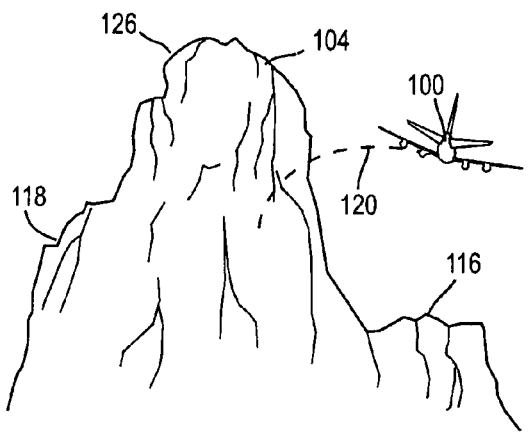

In an exemplary embodiment, the aircrew is provided with a graphical display (see FIGS. 1 and 6) that visually indicates to the aircrew that right travel path 120 requires the least amount of evasive maneuvers. In FIG. 7B, airplane 100 travels on right travel path 120. Airplane 100 traveling on right travel path 120 traverses mountain 104 without having to ascend, while providing an advantageous buffer zone between airplane 100 and mountain 104.

Figure 7C:
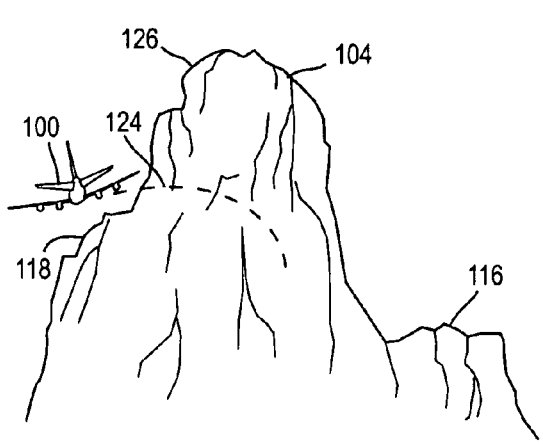

In FIG. 7C, airplane 100 travels on left travel path 124, which requires extensive evasive maneuvers. Airplane 100 traveling on left travel path 124 traverses mountain 104 by ascending and steering away from steep side portion 118. In this exemplary embodiment, left travel path 124 allows for the minimum buffer zone between airplane 100 and mountain 104.

Figure 7D:
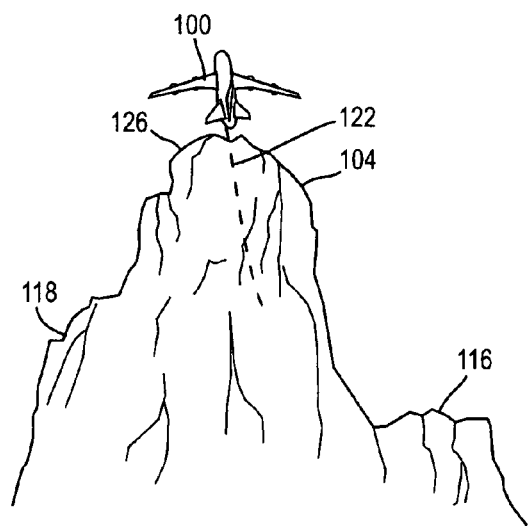

In FIG. 7D, airplane 100 travels on pull-up travel path 122 which requires significant evasive maneuvers. Airplane 100 traveling on pull-up travel path 122 traverses mountain 104 by ascending over peak portion 126. In this exemplary embodiment, pull-up travel path 126 allows for a medium sized buffer zone between airplane 100 and mountain 104.

In an exemplary embodiment, a warning system database 226 may be configured to provide navigational instruction in replacement of, or to supplement, the aircrews' decision-making process.

Figure 8:
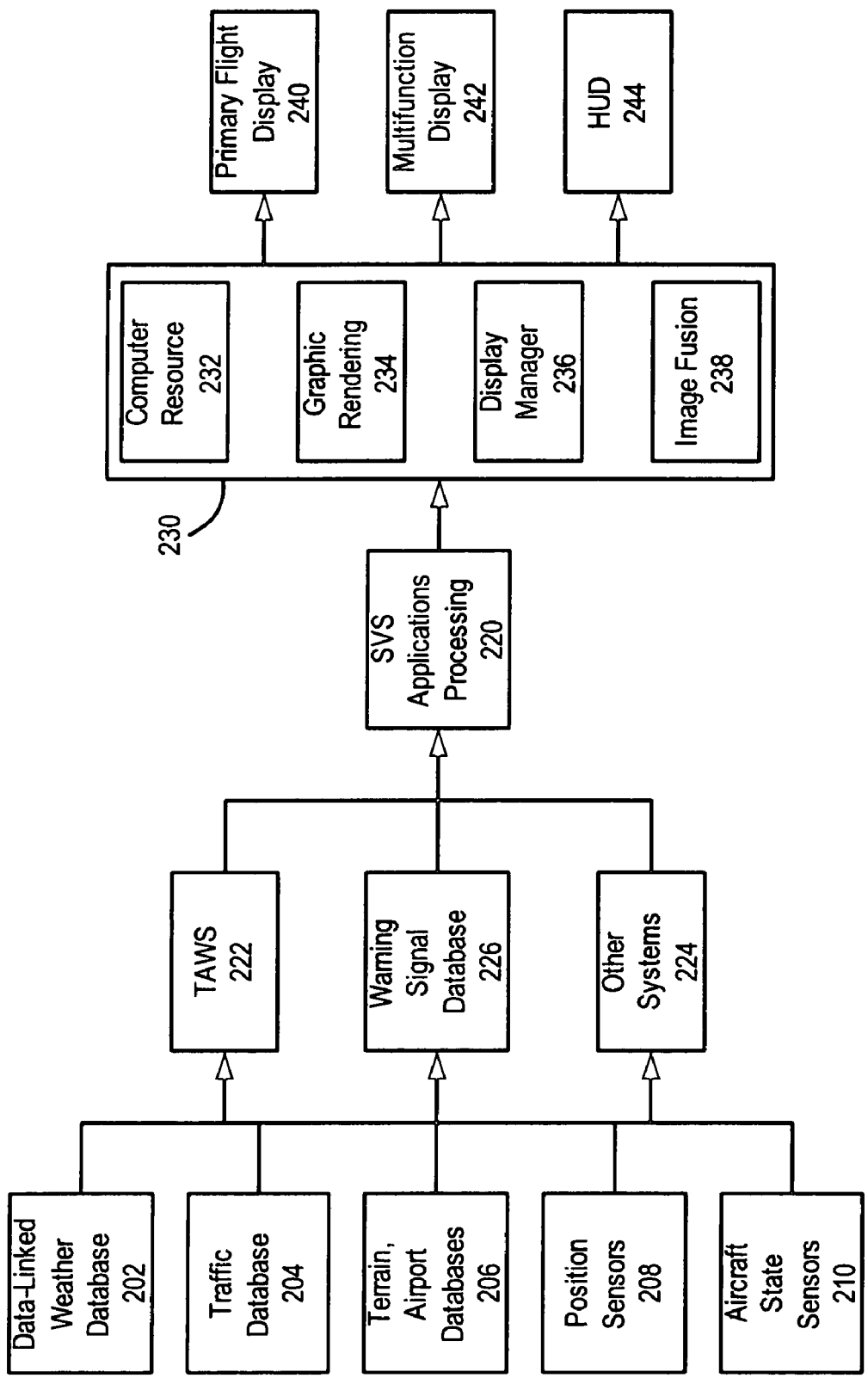
FIG. 8 is a block diagram of the synthetic vision information system, according to an exemplary embodiment.

Referring to FIG. 8, a block diagram illustrating a synthetic vision information system (SVIS) 200 is shown, according to an exemplary embodiment. Synthetic vision information system 200 is configured to receive data from sensors and databases associated with airplane 100. The sensors and databases may be located on airplane 100 or remotely located and connected to airplane 100 through a data link. Exemplary sensors and databases may include a data-linked weather database 202, an air traffic database 204, terrain and airport databases 206, position sensors 208, and aircraft state sensors 210. According to alternative embodiments, SVIS 200 may include more, fewer, and/or different sensors and databases to perform the functions described herein.

Data-linked weather database 202 may be any type of database configured to store and allow retrieval of weather-based information. Data-linked weather database 202 may further be configured to store information related to the weather, such as weather-related effects on sensor data and weather-related effects on a projected flight path.

Traffic database 204 may be any type of database configured to store and allow retrieval of air traffic information. The air traffic information may be continuously updated based on changes in the aircraft's position and changes in the position of nearby aircraft. The air traffic information may be generated onboard the aircraft (using a traffic alert and collision avoidance system (TCAS), an automatic dependent surveillance system (ADS-B), or other systems) or generated by a remote air traffic controller and then transmitted to the aircraft through a wireless data link.

Terrain and airport databases 206 may be any type of databases configured to store and allow retrieval of information related to terrain and/or airports. The information may include detailed three-dimensional terrain and airport map data configured to be utilized in generating an integrated terrain map for SVIS 200. The integrated map may include both the terrain data and the aircraft data or just the terrain data. The data may include representations of all terrain and airports along an aircraft's flight path, terrain and airport data related to specific airports, or any other selection of data. The terrain data may include terrain shapes (i.e., hills and mountains), terrain features (i.e., trees, lakes, and buildings) and/or any other relevant information. Airport data may include an airport configuration, aircraft weather data, aircraft approaches and traffic information.

Position sensors 208 may include any type of sensor configured to aid in determining an aircraft's position. Examples may include global positioning sensors, ground radar sensors and radio triangulation sensors. The position data may include geographic location such as longitude and latitude as well as vertical position (i.e. altitude).

Aircraft state sensors 210 may include any type of sensor configured to aid in determining the state of the aircraft. Exemplary state information may include aircraft altitude (i.e., pitch, yaw and airspeed), aircraft systems' operation state, or any other data related to the operation of the aircraft.

Synthetic vision information system 200 further includes a plurality of processing engines configured to receive database and/or sensor data and generate data spatially integrating the aircraft position and flight information with terrain detail. The processing engines may further be configured to receive user input to control generation of the integrated information. The generated data may be generated to represent a three-dimensional map showing terrain data and the flight plan and projected vertical trajectory of the aircraft in the context of the terrain. The generated data may include data generated for multiple views and multiple maps. The processing engines may include a synthetic vision system (SVS) processing engine 220, a terrain avoidance warning system 222, warning signal database 226 and a plurality of other systems configured to generate projected and/or real-time data based on the input from the databases and sensors.

SVS processing engine 220 may be any type of processing engine configured to receive data from the databases and sensors and generate the data for an integrated terrain map superimposing the aircraft and related information on terrain and/or airport detail. The integrated terrain map may be generated in any standard data format, such that the data may be utilized to generate the integrated terrain map for display to an aircraft's flight crew. Processing engine 220 may further be configured to generate an area or region of interest based on received or stored information, such as sensor data, a flight plan and an obstacle database. Although processing engine 220 is described herein as a single processing engine, processing engine 220 may alternatively include multiple processing engines that are networked together to perform the functions described herein. Processing engine 220 may further be configured to perform as a resolution management engine or configured to provide high resolution display information for an area or region of interest, as will be further discussed below.

Terrain awareness warning system (TAWS) 222 may be any type of system configured to apply the aircraft information such as a projected flight path based on current aircraft altitude relative to terrain and/or traffic data to determine whether there is any risk that the terrain or air traffic will interfere with the projected flight path. TAWS 222 may further be configured to generate one or more suggested modification to the aircraft attitude to avoid any potential interference.

Warning signal database 226 may be any type of system configured to apply the aircraft information such as a projected flight path based on current aircraft altitude relative to terrain to determine whether there is any risk that the terrain will interfere with the projected flight path. Warning signal database 226 has a learning logic that incorporates discrepancies between warning signal database 226 and TAWS 222, terrain database 206, and/or any other any other caution or warning database. Warning signal database 226 continually updates itself and provides quality assurance reports to allow these updates in warning signal database 226 to be validated.

Other processing engines 224 may include any other type of processing engine that may be desirable in generating the integrated terrain map, including aircraft data. Exemplary systems may include navigation systems, flight control systems, and pilot interface systems.

According to an exemplary embodiment, the above-described processing engines may be coupled such that output generated by one processing engine may be utilized as an input to a second processing engine. Warning signal database 226 and/or TAWS 222 may recognize a potential interference in the projected flight path and be configured to generate output data showing the potential interference and suggesting a revised fight path. SVS processing engine 220 may be configured to receive the output data showing the potential interference and suggested revised fight path(s) and generate the integrated terrain map illustrating the interference and suggested change(s) in flight path within the context of the surrounding terrain.

In an exemplary embodiment, warning signal database 226 is coupled to the processing circuit. Warning signal database 226 transmits a first warning signal to the processing circuit. Terrain awareness and warning system 222 transmits a caution signal and/or a second warning signal to the processing circuit. The processing circuit is configured to retrieve a terrain data from terrain database 206 and determine a display configuration signal which is sent to graphic processing engine 230 based on the terrain data, the first warning signal and the caution signal and/or the second warning signal. In another exemplary embodiment, a logic function is utilized to prioritize the first warning signal, the caution signal and/or the second warning signal. In a further exemplary embodiment, warning signal database 226 stores discrepancies between terrain database 206, first warning signal, the caution signal and/or the second warning signal. In another exemplary embodiment, the processing circuit modifies warning signal database 226 based on the discrepancies between terrain database 206, first warning signal, the caution signal and/or the second warning signal. In yet a further exemplary embodiment, the processing circuit primarily utilizes the first warning signal to determine the display configuration signal. In another exemplary embodiment, the processing circuit primarily utilizes the caution and/or second warning signal to determine the display configuration signal. In yet another exemplary embodiment, the processing circuit mathematically weights both the first warning signal and the caution and/or second warning signal to determine the display signal. The calculation may be based on a time series model or any other prioritization methodology.

Synthetic vision information system 200 further includes a graphics processing engine 230 configured to generate the terrain map, including aircraft data. Graphics processing engine 230 may include a computer resource 232, a graphical rendering engine 234, a display manager 236, and an image fusion engine 238. Graphics processing engine 230 may further include additional, fewer, and/or different engines to perform the functions described herein.

Computer resource 232 may be any type of processing engine configured to perform a series of instructions, such as a central processing unit (CPU). Computer resource 232 may be configured to handle computations, such as mathematical transformations, projections and logic to prepare data and commands that will be passed to graphics rendering engine 234.

Graphics rendering engine 234 may be any type of graphics rendering engine configured to receive the integrated terrain data and generate an integrated terrain map, including aircraft data for display on an aircraft display. Graphics rendering engine 234 performs coordinate transformation, depth buffering and rasterization functions to convert lowest level graphical commands to displayed information. Further image rendering may be performed in part by additional components within graphics processing engine 230.

Display manager 236 may be a software application. Display manager 236 is configured to control individual application's access to displays 240-242, further described below. Display manager 236 is configured to manage the display of information on the displays, such as application windows and their sizing, positioning and prioritizing. According to alternative embodiments, display manager 236 may be implemented using hardware and/or firmware.

Image fusion engine 238 may be any type of engine configured to integrate the aircraft data with the terrain and/or airport data to generate the integrated terrain map. According to an exemplary embodiment, image fusion engine 238 may be implemented using any of a variety of methods, such as dedicated hardware merging and blending solutions using digital signal processors (DSPs) or customized application-specific interface circuits (ASICs) or software enabled blending via the graphics rendering engine 234.

Synthetic vision information system 200 may further incorporate three types of displays to help increase pilot situational awareness. A heads-up display (HUD) 244 includes terrain cues and helps keep the crew aware of the situation outside of the aircraft. A primary flight display (PFD) 242 displays the integrated terrain map, including all tactical information such as flight path, pathway and terrain to augment the crew's decision-making capability. A multifunction display (MFD) 240 provides key strategic information, improving crew awareness of terrain, obstacles, traffic and weather.

Figure 9:
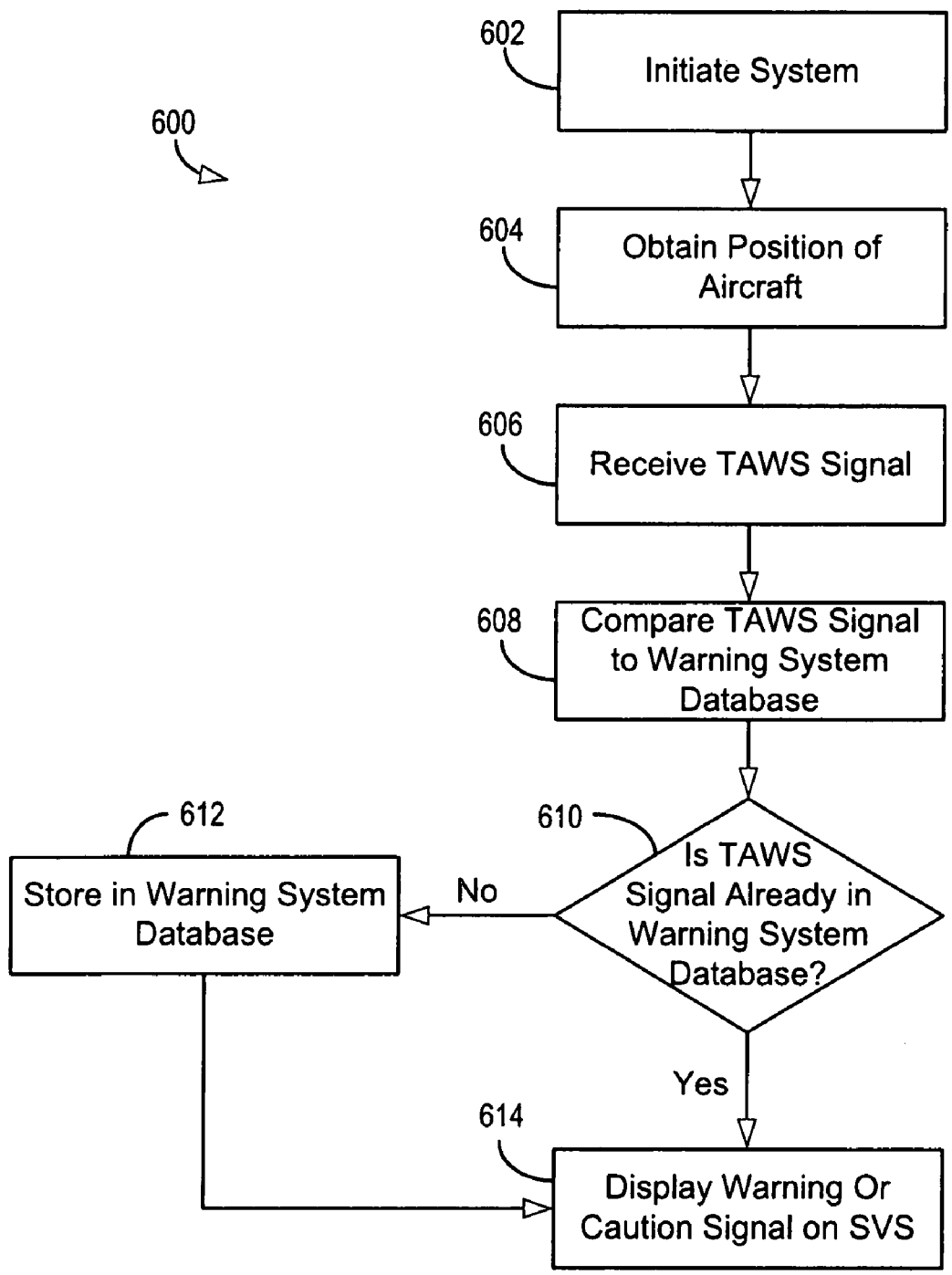
FIG. 9 is a flowchart of a system operating procedures, according to an exemplary embodiment.

Referring now to FIG. 9, a flowchart 600 illustrating a method of generating an integrated terrain map on the SVS is shown, according to an exemplary embodiment. In step 602, the system is initiated which may be accomplished either by pressing an on/off button, aircraft start up, aircraft flight, audio commands or any combination thereof. In step 604, airplane 100 position is determined by sensors on airplane 100, a global positioning satellite system, a ground station, or any combination thereof. In step 606, TAWS sends and the system receives, a TAWS warning and/or a caution signal. In step 608, the system controller compares the TAWS warning and/or caution signal received from TAWS to a warning system database. If the TAWS warning and/or caution signal received from TAWS for this specific location is already stored in warning signal database 226, then the system moves to step 614 where the TAWS warning and/or caution signal is displayed on the system. If the warning and/or caution signal received from TAWS for this specific location is not already stored in warning signal database 226, then the system stores the warning and/or caution signal data in warning signal database 226 and then moves to step 614 where the warning and/or caution signal is displayed on the system.

In an exemplary embodiment, warning signal database 226 stores all of the previous TAWS warning and/or caution signals received by the system from TAWS or any other warning system. Warning signal database 226 stores these previous warning and/or caution signals along with the corresponding terrain location points to develop a comprehensive, dynamic and integrated warning system. In an exemplary embodiment, after warning signal database 226 has compiled a predetermined amount of warning signal data points, warning signal database 226 can act independently without any assistance from other warning systems. In another exemplary embodiment, warning signal database 226 can be supplemented and/or augmented with other warning systems.

Figure 10:
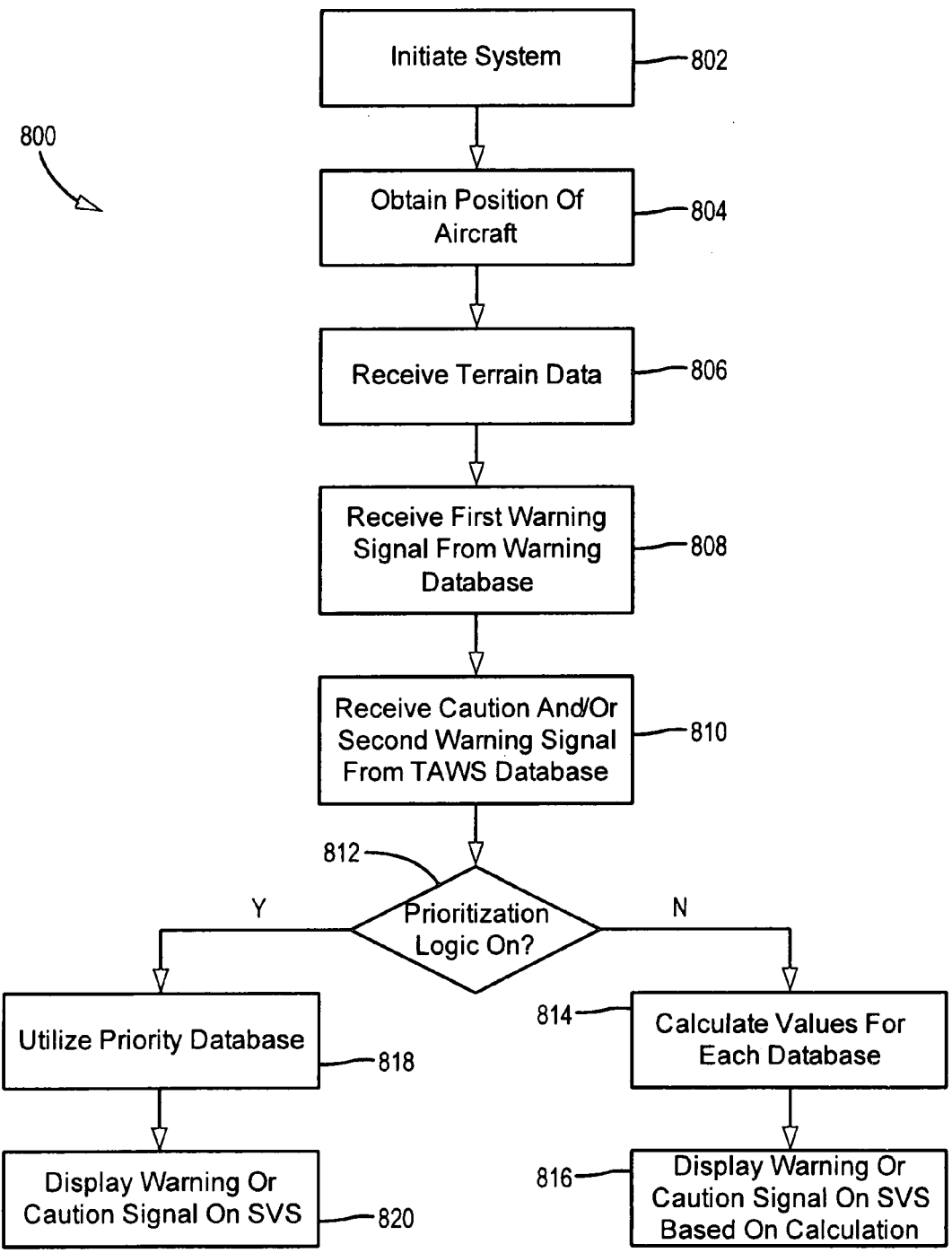
FIG. 10 is a flowchart of another system operating procedures, according to an exemplary embodiment.

Referring now to FIG. 10, a flowchart 800 illustrating a method of generating an integrated terrain map on the SVS is shown, according to an exemplary embodiment. In step 802, the system is initiated which may be accomplished either by pressing an on/off button, aircraft start-up, aircraft flight, audio commands or any combination thereof. In step 804, airplane 100 position is determined by sensors on airplane 100, a global positioning satellite system, a ground station or any combination thereof. In step 806, the processor receives a terrain data from terrain database 206. In step 808, the processor receives a first warning signal from warning signal database 226. In step 810, the processor receives a caution and/or a second warning signal for TAWS database 222. In step 812, the system determines whether a prioritization logic is on or off. If the prioritization logic is off, the system moves to step 814. In step 814, the system calculates a value for each signal and combines these individual values to create a display signal. These individual values for each signal may be based on a weighted average, moving average, autoregressive formula or any other mathematical equation. In step 816, the display signal is sent to the display and the caution and/or warning signal is illustrated on the SVS.

If the prioritization logic is on, the system moves to step 818. In step 818, the system determines that a predetermined database has been chosen as the primary database. In step 820, the system display the caution and/or warning signal based on the signal received from this predetermined primary database. In exemplary embodiments, the predetermined primary database may be warning signal database 226, TAWS database 222 or any other database. In an exemplary embodiment, the system may be configured to override the predetermined primary database based on obstacle characteristics, airplane 100 characteristic, sensor data and/or system performance indices.

Figure 11:
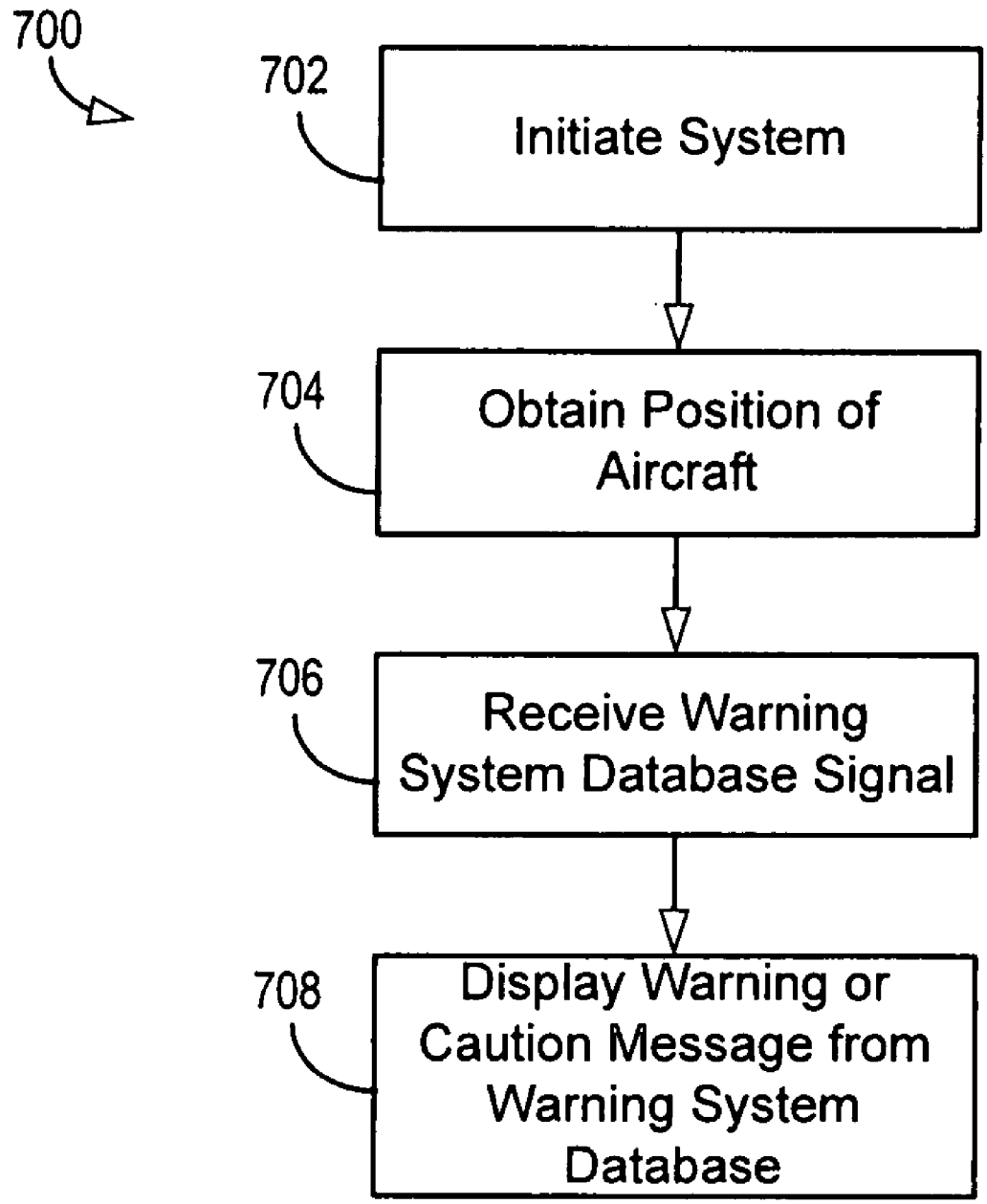
FIG. 11 is a flowchart of another system operating procedures, according to an exemplary embodiment.

Referring now to FIG. 11, a flowchart 700 illustrating a method of generating an integrated terrain map on the SVS is shown, according to an exemplary embodiment. In step 702, the system is initiated which may be accomplished either by pressing an on/off button, aircraft start-up, aircraft flight, audio commands or any combination thereof. In step 704, airplane 100 position is determined by sensors on airplane 100, a global positioning satellite system, a ground station or any combination thereof. In step 706, the warning system database sends, and the system receives, a warning and/or a caution signal. In step 708, the system displays the warning and/or caution signal on a display screen.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the SVS system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

Although the description contains many specificities, these specificities are utilized to illustrate some of the preferred embodiments of this application and should not be construed as limiting the scope of the application. The scope of this application should be determined by the claims, their legal equivalents, and the fact that it fully encompasses other embodiments which may become apparent to those skilled in the art.

What is claimed is:

1. An aircraft warning system for an aircraft including a display and in communication with the display, the aircraft including a terrain awareness and warning system, the aircraft warning system, comprising:
    a processing circuit in communication with the terrain awareness and warning system;
    a warning signal database in communication with the processing circuit, the warning signal database comprising data related to previous cautions and warnings generated by the terrain awareness and warning system, wherein a first warning signal is provided in response to aircraft information and the data;
    wherein the terrain awareness and warning system is configured to transmit a caution signal, a second warning signal or both the caution signal and the second warning signal to the processing circuit; and
    the processing circuit configured to provide an indication of at least one of the first warning signal, the caution signal, and the second warning signal on the display.

2. The aircraft warning system of claim 1, further comprising a graphic processing engine in communication with the display and the processing circuit.

3. The aircraft warning system of claim 1, further comprising a sensor system in communication with the processing circuit, the terrain awareness and warning system, a terrain database and the warning signal database.

4. The aircraft warning system of claim 1, wherein a logic function is utilized to prioritize the first warning signal, the caution signal and/or the second warning signal.

5. The aircraft warning system of claim 1, wherein the warning signal database stores discrepancies between the terrain database, first warning signal, the caution signal and/or the second warning signal.

6. The aircraft warning system of claim 1, wherein the processing circuit modifies the warning signal database based on discrepancies between the terrain database, first warning signal, the caution signal and/or the second warning signal.

7. The aircraft warning system of claim 1, wherein the processing circuit primarily utilizes the first warning signal to determine a display configuration signal.

8. A terrain advisory display, comprising:
    a display;
    a processing circuit in communication with the display;
    a terrain database in communication with the processing circuit;
    a warning signal database in communication with the processing circuit, the warning signal database comprising data related to previous cautions and warnings generated by a terrain awareness and warning system, the warning signal database providing a first warning in response to aircraft information and the data;
    the terrain awareness and warning system in communication with the processing circuit; and
    wherein the display is configured to generate a three-dimensional image and provide indications of the first warning in response to the processing circuit.

9. The terrain advisory display of claim 8, further comprising a sensor system in communication with the processing circuit, the terrain database, the warning signal database and the terrain awareness and warning system.

10. The terrain advisory display of claim 9, wherein the terrain awareness and warning system is configured to transmit a caution signal and/or a second warning signal.

11. The terrain advisory display of claim 9, wherein a logic function is utilized to prioritize the first warning signal, the caution signal and the second warning signal to determine a display configuration signal.

12. A method for generating a three-dimensional image for an aircraft terrain advisory system, the method comprising:
    receiving a terrain data from a terrain database;
    receiving a first warning signal from a warning signal database, the warning signal database comprising data related to previous cautions and warnings generated by a terrain awareness and warning system, the warning signal database providing the first warning in response to aircraft information and the data;
    receiving a caution and/or a second warning signal from the terrain awareness and warning system;
    defining the three-dimensional image base upon the first warning signal, the caution, or the second warning signal;
    generating the three-dimensional image; and
    displaying the three-dimensional image on the aircraft terrain advisory system.

13. The method of claim 12, further comprising a sensor system in communication with a processing circuit, the terrain database, the warning signal database and the terrain awareness and warning system.

14. The method of claim 12, wherein the processing circuit is configured to utilize the first warning signal, the caution signal and/or the second warning signal to determine a display configuration signal.

15. The method of claim 14, wherein a logic function is utilized to prioritize the first warning signal, the caution signal and/or the second warning signal.

16. A terrain advisory system for an aircraft, comprising:
    a means for displaying data on the aircraft;
    a means for generating a terrain data;
    a means for generating a terrain signal;
    a means for generating a first warning signal based on data related to previous cautions and warnings generated by a terrain awareness and warning system means;
    a means for generating a caution and/or a second warning signal;
    a means for generating a three-dimensional image based on the caution signal, the second warning signal or the first warning signal; and
    a means for displaying the three-dimensional image.

17. The terrain advisory system of claim 16, further comprising a means for generating a plurality of aircraft sensor data.

18. The terrain advisory system of claim 16, further comprising a warning signal database.

19. The terrain advisory system of claim 16, wherein the processing circuit is configured to utilize the first warning signal, the caution signal and/or the second warning signal to determine a display configuration signal.

20. The terrain advisory system of claim 16, wherein a logic function is utilized to prioritize the first warning signal, the caution signal and/or the second warning signal.

* * * * *